United States Patent
Batthala et al.

(10) Patent No.: US 7,686,095 B2
(45) Date of Patent: Mar. 30, 2010

(54) IMPLEMENT HEIGHT CONTROL SYSTEM

(75) Inventors: Sivakumar Batthala, Woodridge, IL (US); Brian A. Hartman, Clarendon Hills, IL (US)

(73) Assignee: CNH America LLC, New Holland, PA (US)

( * ) Notice: Subject to any disclaimer, the term of this patent is extended or adjusted under 35 U.S.C. 154(b) by 569 days.

(21) Appl. No.: 10/975,265

(22) Filed: Oct. 28, 2004

(65) Prior Publication Data

US 2006/0108127 A1     May 25, 2006

(51) Int. Cl.
*A01B 41/06* (2006.01)
(52) U.S. Cl. ............................... 172/2; 701/50
(58) Field of Classification Search .......... 172/1, 172/2, 4; 701/50
See application file for complete search history.

(56) References Cited

U.S. PATENT DOCUMENTS

| | | | |
|---|---|---|---|
| 3,716,159 A * | 2/1973 | Papasideris et al. ......... | 414/699 |
| 3,917,002 A * | 11/1975 | Mueller, Jr. .................. | 172/9 |
| 4,120,364 A | 10/1978 | Wooldridge | |
| 4,221,266 A * | 9/1980 | Fardal .......................... | 172/4 |
| 4,924,374 A * | 5/1990 | Middleton et al. ............ | 700/57 |
| 4,934,463 A | 6/1990 | Ishida et al. | |
| 5,261,495 A | 11/1993 | Szymczak | |
| 5,469,694 A | 11/1995 | Panousheck et al. | |
| 6,085,846 A | 7/2000 | Buchl et al. | |
| 6,205,385 B1 | 3/2001 | Stelzle et al. | |
| 6,278,955 B1 | 8/2001 | Hartman et al. | |
| 6,292,729 B2 | 9/2001 | Falck et al. | |
| 6,681,551 B1 | 1/2004 | Sheidler et al. | |
| 6,718,246 B2 | 4/2004 | Griffith et al. | |
| 6,735,889 B1 * | 5/2004 | Berger et al. ................. | 37/348 |

* cited by examiner

*Primary Examiner*—Thomas B Will
*Assistant Examiner*—Jamie L McGowan
(74) *Attorney, Agent, or Firm*—Patrick M. Sheldrake; John William Stader; Michael G. Harms (57) ABSTRACT

A height control system for an implement coupled to a tractor is provided, the implement being raised and lowered by a hydraulic cylinder on the implement, and the height of the implement being sensed by a position sensor on the implement. An operator input device, such as a lever, is coupled to a digital controller network on the tractor and is used to position the implement before setting upper and lower desired implement heights or set points. The operator input device is also used to raise and lower the implement to the upper and lower desired implement heights by moving the operator input device between first and second predetermined detent positions.

17 Claims, 4 Drawing Sheets

IMPLEMENT HEIGHT CONTROL SYSTEM

FIELD OF THE INVENTION

The present invention relates generally to agricultural cultivating vehicles. More particularly, it relates to tractors and tractor implements. Even more particularly, it relates to systems and methods for controlling the height of an implement towed by a tractor with respect to the ground.

BACKGROUND OF THE INVENTION

One of the most common uses of agricultural tractors is to tow implements through agricultural fields to cultivate the soil. There are many such implements, and many of these implements have the capability of being raised or lowered with respect to the ground. This is often desirable to control the depth of cultivation performed by various ground-engaging devices attached to the frame of the implement. As the frame is lowered closer to the ground, the ground engaging devices dig deeper into the soil. As the frame is raised higher above the ground, the ground engaging devices dig more shallowly into the soil.

In the most common arrangement, the implement has one or more wheels that are pivotally coupled to the frame of the implement. The position of these wheels is varied by controlling the extension or retraction of a hydraulic cylinder. By extending or retracting the hydraulic cylinder, the operator of the tractor can raise and lower the frame of the implement with respect to the ground.

Typically, the operator has a manually operable device in the cab of the tractor that he manipulates to raise and lower the implement accordingly. The operator grasps the device and moves it through a range of positions, each of said positions having a corresponding implement height. To move the implement to any specific height, the operator merely grasps the device and moves it to the corresponding position.

Moving the lever will set a preferred height of the implement. It will not, however, keep the implement in that position. To maintain the implement in the selected position, the operator must periodically turn his head around and look at the implement. If the implement has drifted away from the preferred height, the operator must grasp the input device and again manipulate it to shift the implement back to the preferred position. Therefore, even in systems in which the operator can adjust the implement height, he must still visually monitor the position of the implement and "tweak" his operator input device to keep the implement at that precise position.

The continuing requirement to regularly turn his head and inspect the implement adds yet another task to an already task-burdened tractor operator. He must look forward to make sure the tractor is pointed in the proper direction. He must look at his various gauges to determine the tractor is operating properly. He must look at other gauges to make sure that the implement is operating properly. In addition, he must look behind regularly to make sure that the implement is engaging the ground properly.

All of this activity and calculation requires a great deal of concentration on the part of the tractor operator. Anything that can automate these tasks and reduce the number of activities the operator must constantly monitor would be beneficial.

What is needed, therefore, is a system for controlling the heights (and depth of ground engagement of) of an implement towed by an agricultural tractor.

What is also needed is a system for easily changing the desired position of the implement towed by the tractor.

What is also needed is a system for permitting the operator to easily override automatic control of implement height, and to quickly return to automatic control of implement height when desired.

These and other advantages are provided by the system and method described below.

SUMMARY OF THE INVENTION

In accordance with a first aspect of the invention, a tractor implement control system for a tractor is provided, wherein the tractor is coupled to an implement, the implement including at least one hydraulic actuator disposed to raise and lower at least one ground engaging tool with respect to the ground, the implement including an implement position sensor configured to generate a signal indicative of an implement height, wherein the implement height can be varied by the at least one hydraulic actuator, the control system including: an operator input device configured to transmit a signal indicative of a first implement height set point in a first position and to transmit a signal indicative of a second implement height set point when in a second position; and at least one digital controller coupled to a hydraulic valve and coupled to the operator input device and couplable to the position sensor (1) to responsively drive the implement to the first implement height when the input device is moved to the first position and released to return to a neutral position and (2) to responsively drive the implement to the second implement height when the input device is moved to the second position and released to return to the neutral position; wherein the at least one digital controller is further configured to associate any of a plurality of different first implement heights to the first position and any of a plurality of second implement heights to the second position.

The system may further include an auxiliary hydraulic valve mounted on the tractor, the valve being configured to regulate the flow of hydraulic fluid to the hydraulic actuator, and further wherein the at least one digital controller includes at least first and second digital controllers, the first digital controller being coupled to the operator input device, and the second digital controller being coupled to the valve. The system may further include a serial communications link coupling the first and second digital controllers. The at least one digital controller may include control logic for controlling the implement at both the first implement height set point and at the second implement height set point, and further wherein the control logic is selected from the group consisting of a lookup table and a PID control algorithm. The at least one digital controller may include control logic configured to calculate (1) a difference between the first implement height set point and an actual height of the implement indicated by the position sensor when controlling the implement at the first implement height set point, and (2) a difference between the second implement height set point and the actual height of the implement indicated by the position sensor when controlling the implement at the second implement height set point. The input device first position and the input device second position may be detent positions. The implement may include a plurality of downwardly-extending ground engaging tools, and the at least one digital controller may set the first implement height set point at an implement height wherein the ground engaging tools are entirely above the ground, and the at least one digital controller may set the second implement height set point at an implement height wherein the ground engaging tools extend at least partially underneath the surface of the ground. The input device may be a lever having a range of motion from a first position limit to a second position limit, the input device first position may be between 5 and 15 degrees of the first position limit, and the input device second position may be between 5 and 15 degrees of the second position limit.

In accordance with a second aspect of the invention, a computer-implemented method for controlling the height of an implement coupled to a tractor is provided, the method including the steps of: moving the implement to a first implement position with respect to the ground with an operator input device; recording the first implement position in a memory circuit of at least one digital controller; moving the operator input device to a first operator input device position and releasing the input device from the first position to return to a neutral position within a predetermined period of time; and automatically controlling the implement at the first implement position based upon the steps of moving to the first position and releasing from the first position.

The method may include the steps of moving the implement to a second implement position with respect to the ground with the operator input device; recording the second implement position in a memory circuit of at least one digital controller; moving the operator input device to a second operator input device position and releasing the input device from the second position to return to a neutral position within a predetermined period of time; and automatically controlling the implement at the second implement position based upon the steps of moving to the second position and releasing from the second position. The step of recording the first implement position in a memory circuit may include the step of pressing a calibration switch coupled to the at least one digital controller. The operator input device may have a full range of motion from a first limit position to a second limit position and the first operator input device position may be between five and 15 degrees of the first limit position. The operator input device may have a full range of motion from a first limit position to a second limit position and the first operator input device position may be between five and 15 degrees of the first limit position and the second operator input device position may be at the second limit position.

In accordance with a third aspect of the invention, a height control system for an implement coupled to a tractor is provided, the implement including at least one hydraulic actuator disposed to raise and lower the implement with respect to the ground, the implement including an implement position sensor configured to generate a signal indicative of an implement height, wherein the implement height can be varied by the at least one hydraulic actuator, the control system including: means for transmitting a signal indicative of a first implement height set point when in a first position and for transmitting a signal indicative of a second implement height set point when in a second position; and first means for controlling being coupled to a hydraulic valve and coupled to the means for transmitting, said first means for controlling being couplable to the position sensor to responsively drive the implement to the first implement height when means for transmitting is moved to the first position and released to return to neutral and to drive the implement to the second implement height when the means for transmitting is moved to the second position and released to return to neutral; the first means for controlling being further configured to associate any of a plurality of different first implement heights to the first position and any of a plurality of second implement heights to the second position.

The system may also include second means for controlling hydraulic fluid flow mounted on the tractor, the second means being configured to regulate the flow of hydraulic fluid to the hydraulic actuator, and further wherein the first means for controlling includes at least first and second digital controllers, the first digital controller being coupled to the means for transmitting, and the second digital controller being coupled to the second means for controlling. The system may also include means for communicating coupling the first and second digital controllers. The first means for controlling further may include control logic for controlling the implement at both the first implement height set point and at the second implement height set point, and the control logic may be selected from the group consisting of a lookup table and a PID control algorithm. The first means for controlling may include control logic configured to calculate (1) a difference between the first implement height set point and an actual height of the implement indicated by the position sensor when the means for transmitting is in the first position, and (2) a difference between the second implement height set point and the actual height of the implement indicated by the position sensor when means for transmitting is in the second position. The first position of the means for transmitting and the second position of the means for transmitting may be detent positions. The implement may include a plurality of downwardly-extending ground-engaging tools, and the first means for controlling may be able to set the first implement height set point at an implement height wherein the ground engaging tools are entirely above the ground, and the first means for controlling may be able to set the second implement height set point at an implement height wherein the ground engaging tools extend at least partially underneath the surface of the ground. The means for transmitting may be a lever having a range of motion from a first position limit to a second position limit, and the first position of the means for transmitting may be between five and 15 degrees of the first position limit, and the second position of the means for transmitting may be at the second position limit.

In accordance with a fourth aspect of the invention, a digital computer implemented method is provided for setting and controlling the height of a tractor-mounted implement from the cab of a tractor, the cab including a first operator input device coupled to the computer, the method including the steps of manipulating a first operator input device to position the implement at a first desired height in a manual mode of operation; storing the first desired height in a digital memory circuit; moving the first operator input device to a first predetermined position; and signaling the computer to control the implement at the first desired height at least in response to moving the first operator input device to the first position.

The step of signaling the computer to control the implement at the first desired height includes the step of moving the first operator input device to a second position after moving the first operator input device to the first position. The first operator input device is spring loaded to return automatically to the second position when released.

In accordance with a fifth aspect of the invention, an operator input device for an agricultural tractor is provided that is configurable to operate in two modes of operation, a first mode of operation in which the device controls a hydraulic fluid flow proportional to a degree of manual deflection, and a second mode of operation in which the device signals a digital computer to automatically control the height of an implement at a first predetermined height in response to a position sensor signal at least by manipulating the device to a first predetermined position.

The operator input device may be configurable to operate in a third mode of operation in which the device signals a digital computer to control the height of the implement at a second predetermined height by manipulating the device to a second predetermined position. The operator input device may be configurable to temporarily increase the first predetermined height at which the digital computer controls the height of the implement by moving the operator input device away from a neutral position in a first direction. The operator input device may be further configurable to temporarily decrease the first predetermined height at which the digital computer controls the height of the implement by moving the operator input device away from a neutral position in a second direction opposite the first direction. The operator input device may be spring loaded to return to a neutral position when released, and further wherein the device is configurable to further signal the digital computer to automatically control the height of the implement at the first predetermined height in response to a position sensor signal by releasing the device to return to the neutral position after manipulating the device to the first predetermined position.

Numerous other features and advantages of the present invention will become readily apparent from the following detailed description, the accompanying drawings, and the appended claims.

DETAILED DESCRIPTION OF THE PREFERRED EMBODIMENTS

While the present invention is susceptible of being made in any of several different forms, the drawings show a particularly preferred form of the invention. One should understand, however, that this is just one of many ways the invention can be made. Nor should any particular feature of the illustrated embodiment or details of its construction be considered a part of the invention, unless that feature is explicitly mentioned in the claims. In the drawings, like reference numerals refer to like parts throughout the several views.

Figure 1:
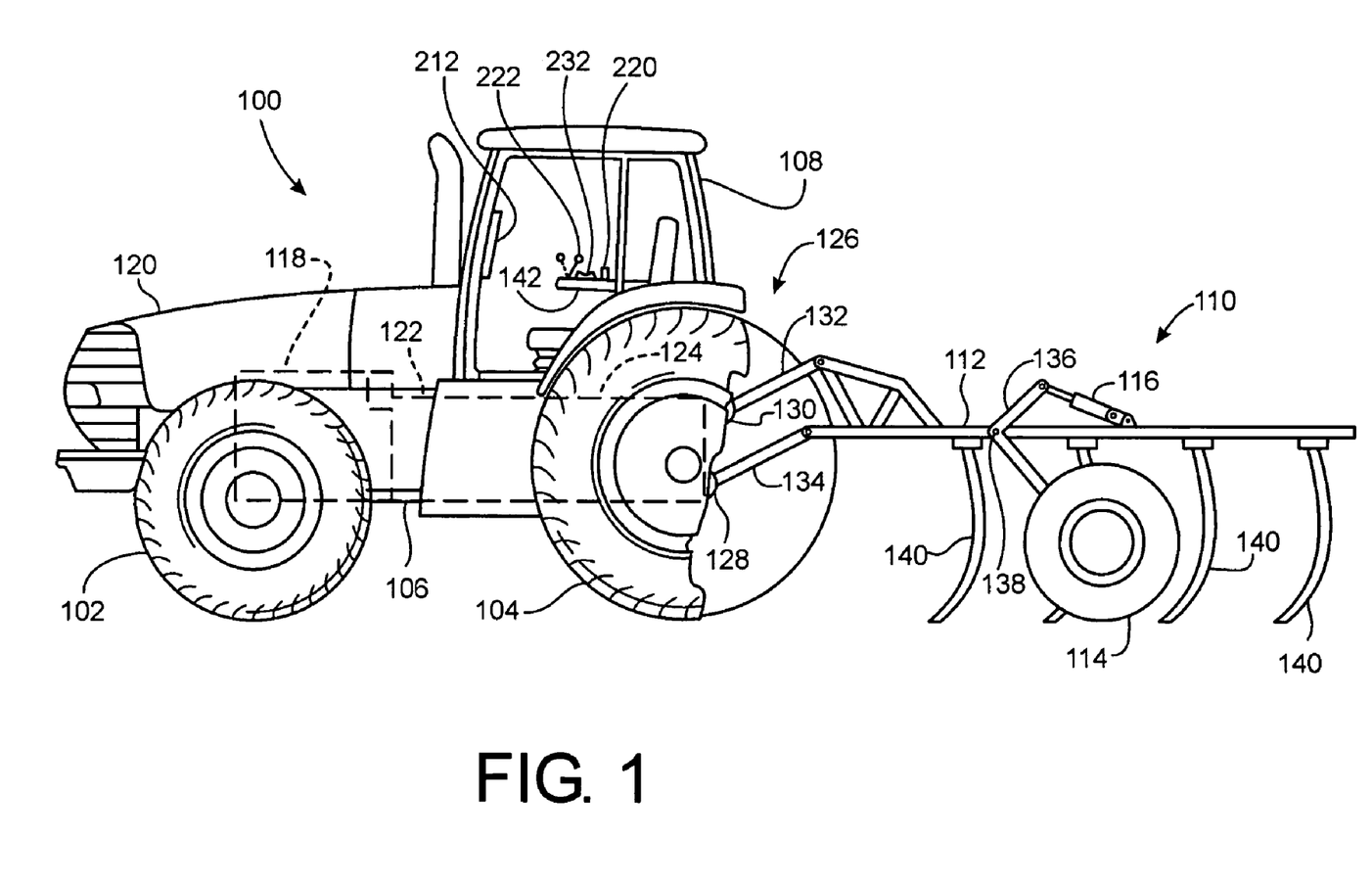
FIG. 1 is a side view of an agricultural tractor coupled to an implement by a three-point hitch in accordance with present invention.

Referring now to FIG. 1, there is illustrated an agricultural tractor 100 having a pair of front wheels 102, a pair of rear wheels 104, a chassis 106, and an operator compartment 108. Tractor 100 is coupled to an implement 110 having a frame or chassis 112 supported by a pair of support wheels 114 for movement over the ground, and a hydraulic actuator, shown here as hydraulic cylinder 116, for adjusting the height of the frame or chassis 112 of implement 110.

The rear wheels 104 of tractor 100 are driven by tractor engine 118, which is disposed under a forwardly extending hood 120 located just in front of the operator compartment 108. A transmission 122 is fixed to the engine and includes a gearbox that provides several gear ratios. A differential 124 is fixed to the rear of the transmission 122 and transfers power to each of rear wheels 104. Engine 118, transmission 122, and differential 124 collectively comprise chassis 106. In an alternative configuration, a separate frame or chassis may be provided to which the engine, the transmission, and the differential are coupled. This configuration is common to smaller tractors.

The operator compartment 108 of tractor 100 is disposed toward the rear of the tractor just over and a little forward of the tractor's three-point hitch 126. Implement 110 is coupled to tractor 100 by 3-point hitch 126.

The height of implement 110 can be controlled in two ways: first, by pivoting three-point hitch 126 about its pivotal couplings 128, 130 to tractor 100. This pivoting is provided by a hydraulic actuator (not shown) that extends between the chassis 106 of tractor 100 and the three-point hitch. When this hydraulic actuator is extended and retracted, it raises and lowers links 132, 134. Since implement 110 is coupled to these links at their after ends, this causes the front end of implement 110 to rise and fall.

The second way in which the implement's height can be controlled is by raising and lowering frame 112 of implement 110 with respect to implement wheels 114. Implement wheels 114 are rotationally coupled to a lower end of mechanical link 136. Link 136, in turn, is pivotally coupled to the frame 112 at pivot point 138. Link 136 is coupled to frame 112 to pivot clockwise or counterclockwise with respect to frame 112 about pivot point 138. Link 136 is pivoted by hydraulic cylinder 116, which is coupled to and between the upper end of plate 136 and frame 112. When cylinder 116 extends, it rotates link 136 counterclockwise with respect to the chassis. Due to the rearward angle at which the lower portion of link 136 extends, this counterclockwise rotation causes wheels 114 to rise upward toward frame 112. As a practical matter, since wheels 114 are typically resting on the ground when cylinder 116 is extended and retracted, wheels 114 do not actually "rise" or "fall". Instead, frame 112 rises or falls with respect to the wheels, and hence with respect to the ground. Thus, whenever hydraulic cylinder 116 extends, frame 112 lowers down towards the ground and whenever hydraulic cylinder 116 retracts, frame 112 rises up away from the ground. Using the frame 112 as a reference point, however, one can say that the wheels are "raised" or "lowered".

Implement 110 has several ground-engaging implements or tools 140 that are coupled to and extend downward from frame 112. These tools may include, for example, plows, rakes, harrows, or other ground cultivating devices. Whenever frame 112 is raised or lowered with respect to the ground, the depth of penetration of tools 140 is also increased or decreased. Thus, whenever hydraulic cylinder 116 extends, tools 140 extend further toward or into the ground. Whenever cylinder 116 retracts, tools 140 move further from, or out of, the ground.

Figure 2:
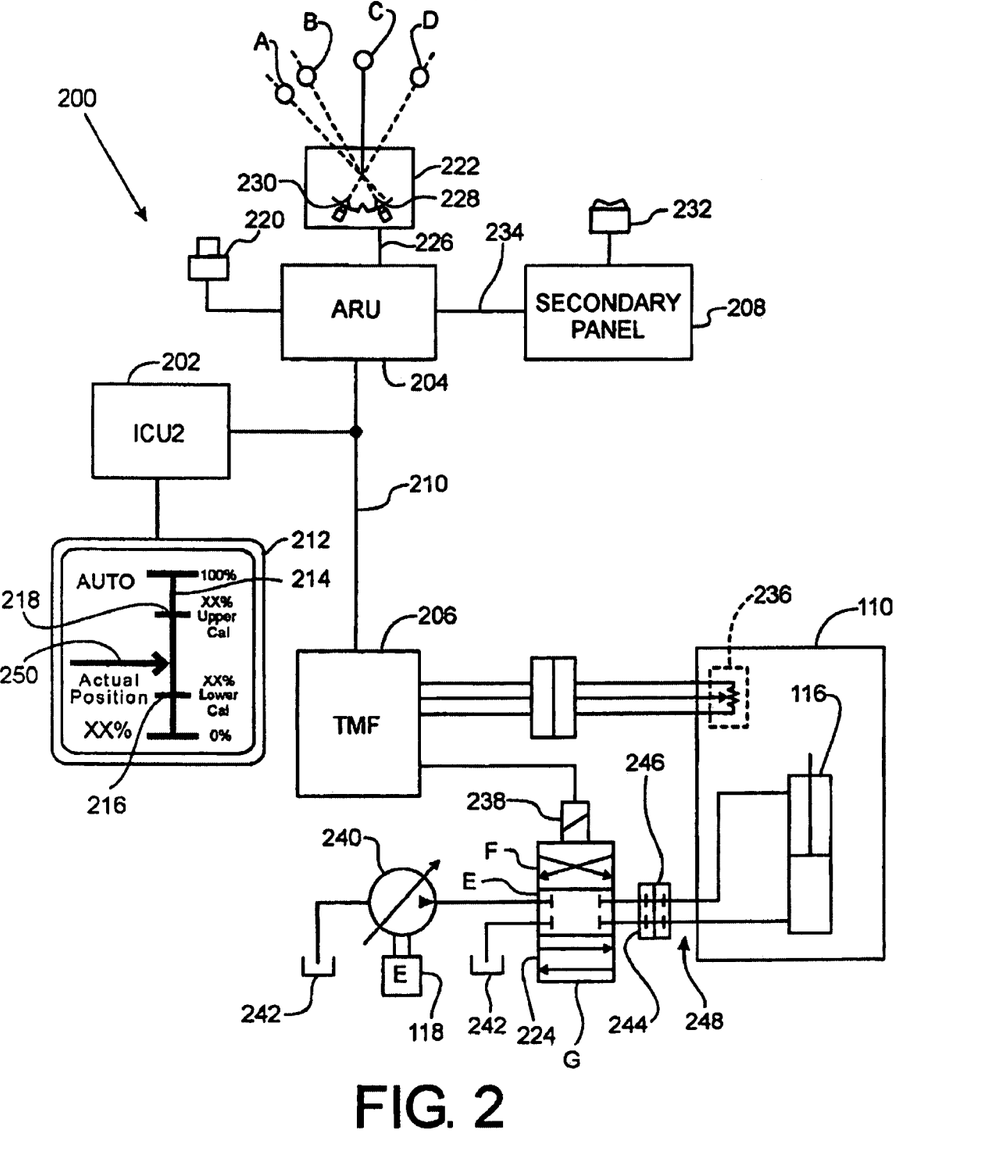
FIG. 2 is an electronic and hydraulic circuit diagram of an implement height control system in accordance with the present invention.

FIG. 2 illustrates a system 200 for controlling the height of implement 110 above the ground. It also illustrates a system for controlling the depth of penetration of implements 140 into the ground. The system is disposed on the tractor-and-implement combination shown in FIG. 1.

System 200 of FIG. 2 includes three digital controllers 202, 204, 206, and a secondary panel 208. The three digital controllers are coupled over a serial communications bus 210. Bus 210 is preferably a controller area network bus such as the bus defined in the SAE J1939 standard.

Figure 3:
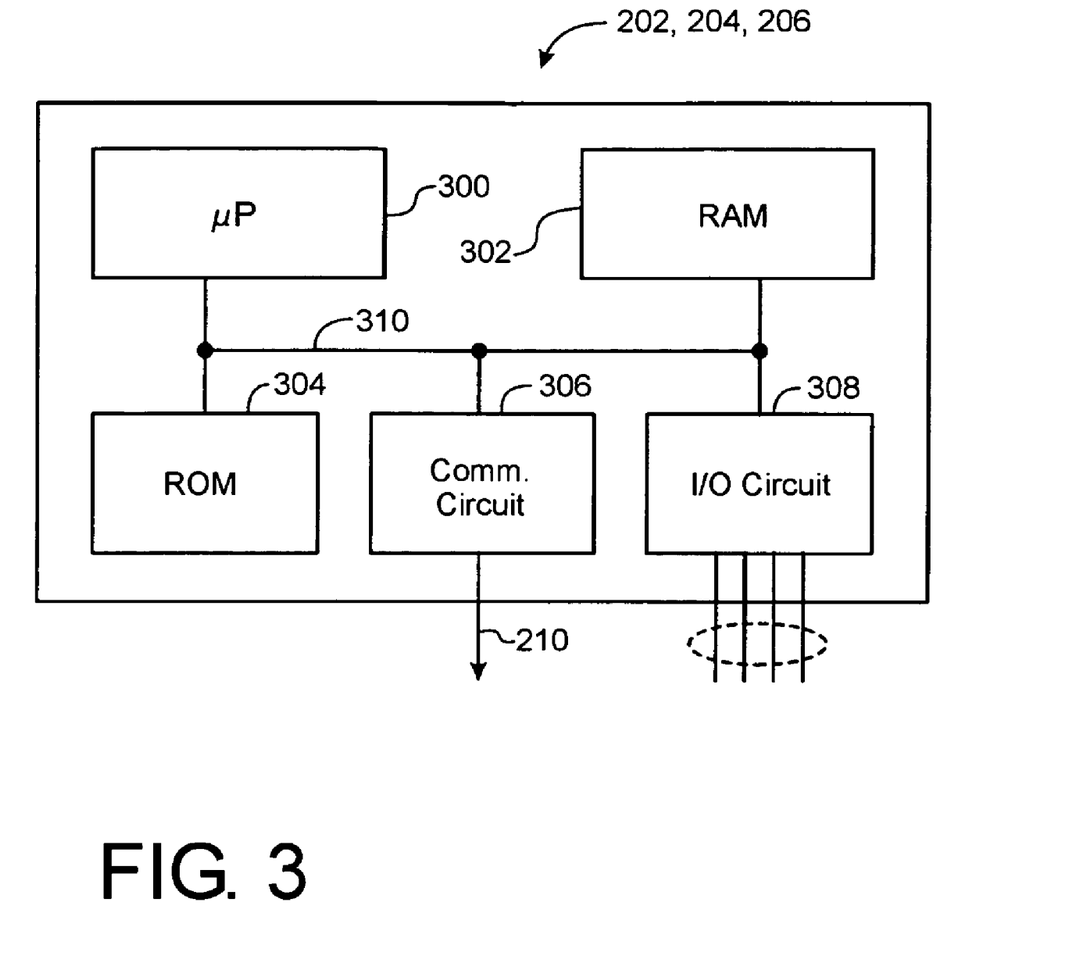
FIG. 3 is a schematic diagram of the construction of all the electronic controllers illustrated in FIG. 2.

Each of the digital controllers 202, 204, and 206 is constructed as shown in FIG. 3. Each digital controller includes a microprocessor 300, a RAM memory 302, a ROM memory 304, a serial communications circuit 306, and a signal conditioning and input/output circuit 308. These five circuits are coupled together over a control/data/address bus 310. The RAM memory is used as working space for computations performed by microprocessor 300. The ROM memory stores digital instructions that are executed by microprocessor 300 as well as permanent numeric values that are used by microprocessor 300 in its calculations. The serial communications circuit 306 is used to communicate with the other digital controllers, to transmit values to them and to receive values from them that are used internally for further processing or for display. The input/output (I/O) circuit 308 is used to condition incoming signals from such devices as switches, sensors, and levers, and to drive output signals for such things as displays and valve solenoids or coils.

The RAM memory is preferably nonvolatile and the ROM memory is preferably electrically rewritable or programmable. This permits the operator to store calibration or configuration values in the controllers that are maintained even when the vehicle is turned off or the controllers (and their memories) are otherwise deenergized.

In the following paragraphs, we will explain how the three controllers cooperate with one another to monitor switches and a lever, to display data on a display, to sense sensor signals, and to drive a hydraulic valve. These operations and cooperating behaviors are stored as sequences of preprogrammed digital instructions in ROM memories 304 of controllers 202, 204 and 206.

Digital controllers 202, 204, and 206 are preferably Siemens brand microcontrollers, even more preferably they are controllers selected from the Siemens C167 family. Serial communications circuits 306 are preferably Siemens or Motorola brand CAN bus controller circuits that are either integrally formed with controllers of the C167 family, or are coupled to C167 controllers.

Referring back to FIG. 2, the first controller 202 is called the "instrument cluster unit" or "ICU2" digital controller or electronic control unit. Its primary function is to drive a flat-panel LCD or electroluminescent display 212 upon which the status and various settings of the implement height control system.

Display 212 displays in graphical form (1) the actual position or height of the implement, (2) a first set point indicating an upper one of two programmed implement heights, and (3) a second set point indicating a lower one of the two programmed implement heights.

The first and second set points are displayed both numerically as a percent of total up-and-down travel of the implement from its least height (0%) to its greatest height (100%). The first and second set points are also displayed graphically as physical (i.e. non-numeric) marks adjacent to a vertically oriented bar 214.

As shown in FIG. 2, bar 214 is equivalent in length to the total 0-100% range of travel of the implement. If, for example, the second set point is set at 20% of the total travel of the implement, its corresponding physical mark (shown here as bar 216 intersecting bar 214) is disposed ⅕ of the distance (20%) from the bottom to the top of bar 214. If, for example, the first set point is set at 65% of the total travel of the implement, its corresponding physical mark (shown here as bar 218 intersecting bar 214) is disposed 65% of the distance up from the bottom to the top of bar 214.

At the same time that displays the set points graphically, display 212 is configured to show the numeric position values (20% and 65%) as well. Thus, display 212 in the preferred embodiment is configured to show both a graphical and a numeric representation of the two programmed set points indicating the two implement height set points. The process by which the two set points are set is described in more detail below.

Electronic controller 202 is configured to receive signals over CAN bus 210 indicating the upper and lower set points as well as whether the implement height control system is enabled (turned "on") or disabled (turned "off"). When controller 202 receives a signal from controller 204 indicating the system is enabled, it energizes display 212 and writes the two set points on the display screen, as shown in FIG. 2. They are written numerically as a percentage, and graphically as a relative position. Since the set points are displayed only when the automatic control system is turned on, their presence on the display screen visually indicates to the operator that the system is enabled. When controller 202 receives a signal from controller 204 indicating that the system is disabled, controller 202 deenergizes display 212, erasing the bars and numbers from display 212, thereby visually indicating to the operator that the system is disabled. While controller 206 is automatically controlling the height of the implement, the implement position is continually updated on the display screen.

The second electronic controller 204 is called the "armrest unit" or "ARU". It is given this name because it is disposed (strictly for convenience) adjacent to the operator's armrest 142 (FIG. 1). Controller 204, like the other digital controllers, is configured as shown in FIG. 3. Controller 204 is coupled to switch 220, to quadrant lever 222, and to secondary panel 208. Controller 204 is configured to sense the position of switch 220 and the position of lever 222. Switch 220 is called the "enable/disable" switch because the system is programmed or configured to automatically control the implement height when switch 220 is turned on (i.e. enabled) and to provide manual control of implement height when switch 220 is turned off (i.e. disabled).

Controller 204 is configured to sense the position of switch 220 and to (1) reconfigure its own operation based upon the switch position, and (2) transmit the switch position over CAN bus 210 to the other digital controllers so they can as well reconfigure their operation based upon the switch position.

Quadrant lever 222 is also called the "AUX" lever because it is generally used to control the operation of tractor auxiliary hydraulic valve 224 coupled to controller 206 in a manual, non-automatic mode of operation.

Controller 204 is programmed to sense the position of lever 222 and to transmit a signal indicating that position to controllers 202 and 206. Controller 204 is also programmed to determine the two implement height set points shown on display 212 based upon the operator's manipulation of lever 222.

Quadrant lever 222 is preferably movable through a continuous range of motion of approximately 90 degrees. It includes a variable resistor, potentiometer or shaft encoder that transmits a lever position signal over signal line 226 to controller 204. This lever position signal indicates the position of lever 222. Signal line 226 is coupled to I/O circuit 308 of controller 204.

Quadrant lever 222 can be moved to several positions. The first of these positions, shown as position "A" in FIG. 2, corresponds to the full forward extension of lever 222, the point at which lever 222 cannot be moved forward any further, in other words, its forward position limit. In this position, lever 222 abuts a stop (not shown) that prevents further forward movement.

The second position, shown as position "B" in FIG. 2 is disposed between five and 15 degrees of position "A" and is associated with a mechanical detent 228. When lever 222 is engaged with detent 228 it provides the operator with a physical indication that lever 222 is in position "B". The operator feels the engagement of lever 222 with detent 228 in the hand that grasps lever 222. Detent 228 may be a ball detent or any similar detent that provides the operator with physical feedback to the hand operating lever 222.

The next position, shown as position "C" in FIG. 2, is the "neutral" position and is disposed approximately midway between the two extreme positions "A" and "D".

The final position, shown as position "D" in FIG. 2, corresponds to a second detent position that is the full rearward position limit of lever 222. This position is associated with a second mechanical lever detent 230. When lever 222 is engaged with detent 230 it provides the operator with a physical indication that lever 222 is in position "D". The operator feels the engagement of lever 222 with detent 230 in the hand that grasps lever 222. Detent 230 may be a ball detent or any similar detent that provides the operator with physical feedback to the hand operating lever 222.

Controller 204 is configured to sense of the position of lever 222 in any of the above five positions and to continuously transmit that position to controllers 202, 206 over bus 210. Controller 204 determines, based upon the lever position signal it receives over signal line 226, whether lever 222 is in position A, B, C, or D or anywhere in between. Furthermore, controller 204 determines, based upon the signal it receives over signal line 226, a numeric value indicative of, and preferably proportional to, the specific deflection of lever 222 over its entire range.

In the FIGURES herein, quadrant lever 222 is shown as an elongated member extending out of the operator's armrest (FIG. 1) adjacent the operator's hand. This is the preferred position for quadrant lever 222. However, lever 222 may be spaced anywhere within the operator's compartment that is convenient for the operator to reach as the tractor moves through the field.

Similarly, in the FIGURES herein, quadrant lever 222 is shown as an elongated member. It need not be an elongated member, however. In an alternative embodiment, it may also be a knob, slider, or other linear or rotary actuator, and preferably a device that generates a signal proportional to its degree of deflection.

Controller 204 is also coupled to a calibration switch 232 that is fixed to secondary panel 208. Calibration switch 232 is also called a "SET" switch, since the operator uses switch 232 to set the upper and lower implement position set points. Controller 204 is configured to receive a signal from switch 232 over signal line 234, which is coupled to I/O circuit 308 of controller 204. The signal controller 204 receives a signal from switch 232 that indicates the position of switch 232 to controller 204.

Switch 232 is preferably a momentary contact rocker switch having three positions: (1) a central, neutral position to which the switch returns whenever it is not manipulated, (2) a first momentary contact position that indicates to controller 204 that the operator wishes to set the upper implement height set point, and (3) a second momentary contact position that indicates to controller 204 that the operator wishes to set the lower implement height set point. The method in which the operator manipulates the switch is discussed in greater detail below.

Controller 206 is the final electronic controller illustrated herein. It is also called the "tractor multifunction controller" or "TMF". In the preferred embodiment, controller 206 performs a variety of functions in addition to helping automatically controlling the height of the implement in accordance with the present invention. This variety of functions is provided in other modes of operation that will not be discussed herein, since they form no part of the invention.

Controller 206 is coupled to an implement height position sensor 236 that in turn is coupled to mechanical link 136. Whenever mechanical link 136 moves with respect to chassis 112, this movement is transmitted to height position sensor 236, which in turn transmits a corresponding position signal to controller 206. Sensor 236 is preferably a rotary position sensor, such as a potentiometer, variable resistor, or shaft encoder.

Sensor 236 is coupled to I/O circuit 308 of controller 206. Height position sensor 236 is configured to sense the movement and the position of link 136. Since wheels 114 are coupled to the lower end of link 136, and since wheels 114 rest upon the ground, the height of implement 110 above the ground and the depth of ground engagement of ground engaging tools 140 in the ground is a function of the position of link 136. The position or height of tools 140 and implement 110 can therefore be determined directly from the position signal generated by position sensor 236.

Controller 206 is programmed to receive the position signal from sensor 236 that indicates the height of implement 110. Controller 206 is programmed to compare the position signal with the upper set point or the lower set point (depending upon the position of lever 222) and to actively control the height of implement 110 by extending or retracting hydraulic cylinder 116.

Controller 206 is programmed to drive the height of implement 110 to an operator-selected one of the upper and the lower set points by selectively driving valve coil 238 of valve 224.

Valve 224 has three positions. It has a first position illustrated in FIG. 2 in which hydraulic cylinder 116 is blocked off from pump 240 and reservoir 242. In this position, shown as position "E" in FIG. 2, the system prevents hydraulic cylinder 116 from extending or retracting.

Valve 224 has a second position, identified as position "F" in FIG. 2, in which the pump 240 is coupled to the extend port of cylinder 116 and reservoir 242 is coupled to the retract port of cylinder 116. When controller 206 drives valve 224 to position "F", the rod of hydraulic cylinder 116 extends. This extension causes link 136 (FIG. 1) to rotate counterclockwise and lowers chassis 112 of implement 110 closer to the ground. This also causes tools 140 to move closer toward the ground, or (in the event they are already contacting the ground) to extend deeper into the ground.

Valve 224 has a third position identified as position "G" in FIG. 2, in which the pump 240 is coupled to the retract port of cylinder 116 and reservoir 242 is coupled to the extend port of cylinder 116. When controller 206 drives valve 224 to position "G", the rod of hydraulic cylinder 116 retracts. This retraction causes link 136 (FIG. 1) to rotate clockwise and raises chassis 112 of implement 110 higher above the ground. This also causes tools 140 to move farther away from the ground, or (in the event they are already contacting the ground or are otherwise below the surface of the ground) to withdraw from the ground entirely, or to move to a lesser (shallower) depth under the ground.

Valve 224 is a proportional control valve. The signal that controller 206 applies to coil 238 is proportional to the desired displacement of the valve, which in turn is proportional to the desired flow rate of hydraulic fluid through the valve. The greater the signal applied by controller 206 to valve 224, the faster hydraulic fluid flows to and from hydraulic cylinder 116. In a preferred embodiment, valve coil 238 is configured to respond to a pulse width modulated signal, and controller 206 is configured to apply a pulse width modulated signal to valve 224. The valve positions illustrated herein are those which are used by the system to control height of the implement about the ground. Valve 224 may have other positions, however, that are used in different operating modes. For example, valve 224 may be configured to have a neutral position in which both sides of the hydraulic actuator on the implement are connected to a tank or reservoir.

Variable displacement pump 240 (see FIGS. 1 and 2) is coupled to engine 118 and is configured to provide hydraulic fluid under pressure to valve 224 and thence to hydraulic cylinder 116. Reservoir 242 is a hydraulic fluid reservoir that is configured to receive hydraulic fluid from cylinder 116 and to provide hydraulic fluid to the inlet of pump 240. Pump 240 may be dedicated for controlling the height of implement 110. Alternatively, it may provide hydraulic fluid under pressure to a variety of other hydraulic systems on tractor 100. Most preferably, pump 240 supplies hydraulic fluid to a quick release auxiliary hydraulic fluid port 244 mounted on the rear of tractor 100 adjacent to the three-point hitch. A quick-release connector 246 that is coupled to flexible hydraulic conduits 248 is mated to connector 244. Hydraulic fluid is thereby conducted from pump 240, through valve 224, through fluid port 244, through connector 246, and through conduits 248 to hydraulic cylinder 116. Similarly, hydraulic fluid is conducted from hydraulic cylinder 116, through conduits 248, through connector 246, through fluid port 244, through valve 224, and thence to reservoir 242.

Figure 4:
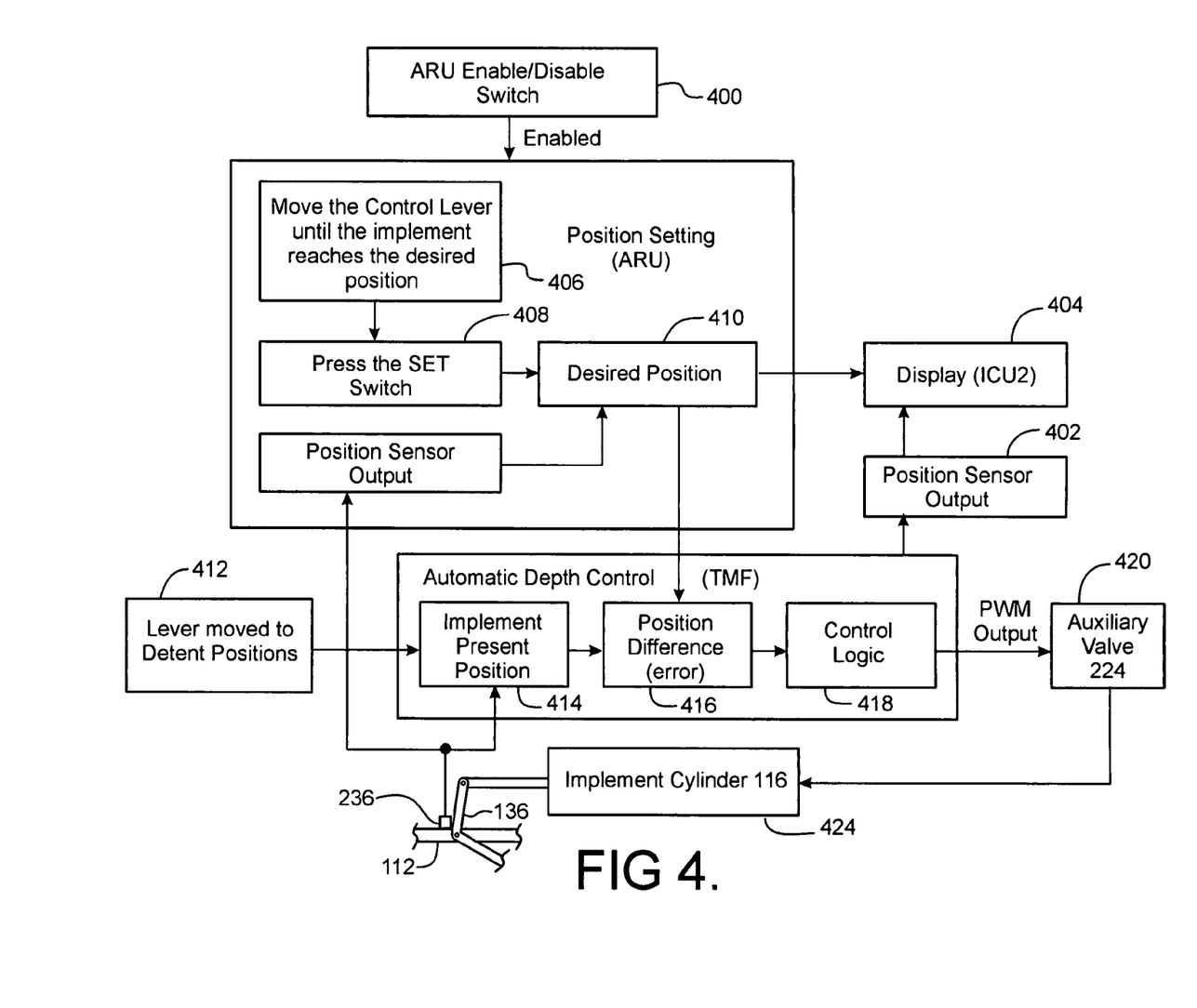
FIG. 4 is a schematic diagram illustrating the steps performed by the system of FIG. 2 (1) as it sets the upper and lower implement position set points and (2) as it automatically controls the height of the implement.

FIG. 4 illustrates the process of the setting the desired upper and lower implement position set points for implement 110. It also illustrates the process of automatically controlling the height of implement 110 above the ground, and hence the degree (or depth) of engagement of tools 140 with the ground.

To set the upper or lower implement position set points or to automatically control the implement height, the operator must first turn switch 220 to its "enabled" position (see block 400). Controller 204, which is coupled to switch 220, responds by transmitting a packet of digital data to controller 202 over bus 210. This packet of data indicates that switch 220 has been turned on. Once it receives this data, controller 202 is programmed to turn display 212 "on" and to display the upper and lower set points in the numeric and graphical forms as shown in FIG. 2.

Controller 206 is coupled to position sensor 236 and is programmed to continuously read the position of implement 110 from sensor 236 and to transmit that position data in packets of digital data over bus 210 (see block 402). Controller 202 is programmed to receive that packet of data with the implement's position and responsively command display 212 to display the actual position of implement 110 (see block 404) both numerically as a percent of full travel of implement 110 and graphically as a pointer 250 visible on display 212 (see e.g. FIG. 2). Pointer 250 is positioned with respect to bar 214 such that its position is proportional to the height of implement 110. Thus, if the actual position of the implement is 35% of the distance between its lowest cylinder 116-adjustable position (0%) and its highest cylinder 116-adjustable position (100%), then pointer 250 will be written on display 212 at a location 35% of the distance up from the bottom of bar 214.

Referring back to FIG. 4, once the operator has enabled the automatic implement height control system by turning switch 220 "on", the operator may then set (or reset) the upper and lower implement position set points. To do this, the operator moves quadrant lever 222 (see step 406) to an intermediate position between positions "A" and "D". As the operator moves lever 222, controller 204 is programmed to read this lever position and transmit that position as packetized digital data over bus 210. Controller 206 is programmed to receive this lever position data and to drive valve 224 to a corresponding position. When the operator moves quadrant lever 222 forward from neutral position "C" toward position "A", controller 206 drives valve 224 in one direction to conduct hydraulic fluid into cylinder 116. The rate at which hydraulic fluid flows into cylinder 116 is proportional to the degree of deflection of lever 222 away from neutral position "C".

Similarly, when the operator moves quadrant lever 222 backward from neutral position "C" toward position "D", controller 206 drives valve 224 in the opposite direction and at a flow rate proportional to the degree of deflection of lever 222 away from neutral position "C" toward position "D". The farther the operator moves lever 222 from the neutral position, the faster the hydraulic cylinder extends or retracts.

While this flow rate is preferably proportional to the quadrant lever position, it need not be perfectly linear. Indeed, it may be desirable to configure the controllers to increase the rate of change a flow rate as a function of how far the lever has been deflected in either direction from neutral position "C". For example, when quadrant lever 222 is positioned only slightly away from the neutral position "C", small deflections of the lever may signal the controllers to provide small corresponding changes in flow rate. In this manner, the operator can make fine adjustments of the flow rate and the implement position. As an example, up change of 3° in the position of quadrant lever 222 can provide a corresponding change in flow rate of perhaps 0.1 gallons per minute of hydraulic fluid.

On the other hand, when quadrant lever 222 is located at or near its limits of travel, deflected quite a distance from neutral position "C", the change in flow rate versus the degree of lever deflection can be much larger. At the limits of lever travel, the controllers can be configured such that small deflections of the lever 222 may provide large corresponding changes in flow rate. For example, a change of 3° in the position of quadrant lever 222 can provide corresponding change in flow rate of perhaps 0.3 gallons per minute of hydraulic fluid.

Of course, the actual flow rate versus degree of deflection relationships will vary depending upon the fluid volume of the implement's cylinder, the angular range of travel of the lever. These particular flow rates should not be understood as fixed, but only as one preferred example that is illustrative of the principle of graduated changes in flow rates.

Once the operator has moved implement 110 to a desired upper implement position, the operator releases lever 222, which is spring loaded to automatically return to the neutral position. As soon as the operator releases lever 222 and it returns to the neutral position, the hydraulic cylinder 116 immediately stops in the desired position.

Once the cylinder is stopped in the desired upper position, the operator toggles SET switch 232 to its upper set point position (see block 408). This causes SET switch 232 to transmit an upper set point signal to secondary panel 208 and thence through signal line 234 to controller 204. This signal functions as an operator's request to controller 206 to save the current position of the implement and use it later to control implement position. Controller 204 is programmed to save this upper set point signal in its RAM or ROM memory (see block 410) and to transmit this upper set point signal to controller 206. The upper set point signal is preferably stored in a nonvolatile portion of the memory that can be rewritten by the controller when the operator again changes the upper set point. When controller 206 gets the upper set point signal, it responsively reads the position signal generated by sensor 236, digitizes it, and saves a digital value indicative of that signal in its ROM memory. When controller 206 later controls the height of the implement, it uses this stored upper implement position signal value as the TARGET position for the implement in the PID control loop.

Similarly, the operator can grasp lever 222 and manipulate it in a similar fashion until implement 110 is in its desired lower implement position (see block 406). Once the operator has moved implement 110 to a desired lower implement position set point, the operator releases lever 222, causing the implement to stop, then toggles SET switch 232 to its lower set point position (see block 408). This causes SET switch 232 to transmit a lower set point signal to secondary panel 208 and thence through signal line 234 to controller 204. This signal functions as a request to controller 206 to save the implement's current position and use it later to control the implement's position. Controller 204 is programmed to save this lower set point signal in its RAM or ROM memory (see block 410) and to transmit this lower set point signal to controller 206. The lower set point signal is preferably stored in a nonvolatile portion of the memory that can be rewritten by the controller when the operator again changes the lower set point. When controller 206 gets the lower set point signal, it responsively reads the position signal generated by sensor 236, digitizes it, and saves the a digital value indicative of that signal in its ROM memory. When controller 206 later controls the height of the implement, it uses this stored lower implement position signal value as its TARGET position.

At this point in the process, the operator has set (or reset) two desired implement heights and saved two corresponding upper and lower position set points (gathered from the position sensor) for future use in the system's PID feedback control calculations.

The operator of the vehicle sets the two set points so he can quickly transition between two heights during vehicle operation. Upon reaching the headlands of a field, for example, the operator will raise the implement to its desired upper position just above the ground, giving him ground clearance to sharply turn the tractor and implement around in the headlands. Upon leaving the headlands, the operator again lowers the implement to the desired lower position—his desired depth of cultivation—and continues down the next row cultivating the crop.

To facilitate this rapid movement between two programmed position set points—the upper position set point and the lower position set point—controller 206 is programmed to provide an automatic mode of operation in which it monitors the actual position of the implement, compares the actual position with the upper (or lower) set point position, and drives the implement to the corresponding upper (or lower) implement position.

Controller 206 is programmed to retrieve the appropriate set point position and to drive implement 110 to that position based upon the operator's movement of lever 222 (see block 412). Whenever switch 220 is turned "on" and the automatic height control system is enabled, controller 206 is programmed to monitor the position of lever 222 (a position that controller 204 is programmed to provide continuously on bus 210 whenever the operator moves lever 222) and to drive implement 110 to its programmed upper or lower positions. Controller 206 determines whether to drive the implement to its upper position or its lower position based upon the position of lever 222.

To select the upper position for automatic control by controller 206, the operator moves lever 222 from its neutral position forward to position "B", one of the two detent positions. Controller 206 is programmed to sense this movement of lever 222 from neutral to "B" and to automatically drive implement 110 to the upper implement position set point if the operator holds lever 222 in position "B" for a predetermined period of time, then releases the lever so it can return of its own accord back to neutral.

To select the lower position for automatic control by controller 206, the operator moves lever 222 from its neutral position backward to position "D", one of the two detent positions. Controller 206 is programmed to sense this movement of lever 222 from neutral to "D" and to automatically drive implement 110 to the lower implement position set point if the operator holds lever 222 in position "D" for a predetermined period of time, then releases the lever so it can return of its own accord back to neutral.

When the operator selects the upper position or the lower position for automatic position control, controller 206 enters into a continuous position control loop in which controller 206 reads the signal from position sensor 236 (see block 414), subtracts it from the desired upper implement position set point (see block 416) to generate an "error" signal, calculates a desired corrective valve signal to be applied to the auxiliary valve (see block 418) based upon the "error" signal, and applies that corrective valve signal to auxiliary valve 224 (see block 420).

Auxiliary valve 224 responsively changes the hydraulic fluid flow to cylinder 116 (see block 424) moving cylinder 116, and hence link 136, closer to the upper set point position. This movement of cylinder 116 causes the signal from position sensor 236 to change. The value of the changed position signal is read by controller 206 (see block 414) and the continuous position control loop repeats itself.

The control logic used to calculate the desired valve signal (see block 418) may include a lookup table stored in the ROM memory of controller 206, or may include a proportional-integral-derivative (PID) control algorithm that is alternatively stored in the ROM memory of controller 206. While a PID control algorithm is desirable, other control algorithms that periodically check the actual position of the implement, compare it with a target position, and, based upon the comparison, calculate a valve signal calculated to return the implement to the target position are also preferred.

When a lookup table is employed, controller 206 is programmed to take the error signal and use it to lookup the corresponding corrective valve signal.

When a PID control algorithm is employed, controller 206 is programmed to take the error signal and determine proportional, integral, and derivative control signal components therefrom. Each of these components is multiplied by its corresponding proportional, integral, and derivative constants, and is summed together. This combined signal (i.e. the corrective valve signal) that is applied to auxiliary valve 224.

The controller 206 process of reading the position of the implement and revising the position of the auxiliary valve is repeated continuously for the entire time that the operator maintains lever 222 in one of the two detent positions and switch 220 is "on".

In the paragraphs above, we explained how controller 206 maintains the implement 110 height at the upper implement position set point when lever 222 is moved to position "B" and released. The same identical process occurs when the operator moves lever 222 to position "D" and releases the lever. It has not been separately described herein since it would be merely duplicative. When lever 222 is in position "D", however, controller 206 is programmed to drive implement 110 to its lower implement position set point.

Thus, the two detent positions are associated with two programmable implement position set points. By placing lever 222 in either of these two detent positions and releasing the lever back to neutral within a predetermined period of time, the operator can signal controller 206 to drive implement 110 to either of these two set points and to actively control the implement at these set points. One advantage to this process is that the operator need not watch the actual position of implement 110 while traveling through the field cultivating the earth. Once the operator has programmed the two set points, he merely moves the lever between the two detent positions. Since the positions are detent positions, the operator can sense directly, through his hand, that lever 222 is in the detent positions. No direct observation of either the lever or the implement is required, just the physical sensation in the operator's hand that lever 222 has engaged a detent.

At any time, the operator can override the automatic control of implement height merely by moving lever 222 to a position away from the neutral position when controller 206 is actively controlling the height of the implement at either the upper or the lower position set point.

When the operator moves lever 222 away from the neutral position while controller 206 is automatically controlling the position, controller 206 is programmed to raise or lower implement 110 slightly above or slightly below the set point.

This temporary adjustment of the set point is useful when the operator wishes to cultivate slightly shallower or slightly deeper for a short period of time as the tractor traverses the field. It also permits the operator to temporarily raise the implement slightly to avoid obstacles or rough terrain. This temporary adjustment does not change either the upper or the lower implement position set point. It merely permits slight deviations from the selected set point, and only for as long as the operator has commanded controller 206 to automatically control the implement height. An advantage to this arrangement is that the operator need not turn off the automatic implement height control by manipulating switch 220 if he merely wishes, for example, to raise (or lower) the implement a little bit "extra" on occasion.

To temporarily adjust the position of the implement above the currently selected set point (whether the upper set point or the lower set point), the operator moves lever 222 slightly forward from the neutral position "C" toward "A". The distance the operator moves lever 222 is proportional to the flow rate into or out of cylinder 116. As soon as the operator has "tweaked" the position of the implement sufficiently, the operator merely releases lever 222, which returns to neutral. The implement stops in its new slightly adjusted position and controller 206 automatically controls the height of the implement at this new slightly raised position.

To temporarily adjust the position of the implement below the currently selected set point (whether the upper set point or the lower set point), the operator moves lever 222 slightly forward from neutral toward "D". The distance the operator moves lever 222 is proportional to the flow rate into or out of cylinder 116. As soon as the operator has adjusted the position of the implement to his satisfaction, the operator releases lever 222. When released, lever 222 returns to its neutral position by a spring force provided by a spring internal to lever 222. The implement stops in its new slightly adjusted position and controller 206 automatically controls the height of the implement at this new slightly lowered position.

This temporary adjustment of the set point does not disable or disengage automatic implement height control. All it does is change the TARGET position used in the PID algorithm to briefly control the implement either slightly above or slightly below the programmed implement position set point.

To disengage the automatic control of implement height even when lever 222 is in either of the two detent positions, all the operator must do is move switch 220 to its "off" (i.e. disabled) position. Controller 204 is programmed to detect the position of switch 220 and to transmit that switch position to the other controllers over bus 210. When controller 206 receives the "off" position, data from switch 220 over bus 210, it stops automatically controlling the implement position according to blocks 414-424 in FIG. 4. Instead, controller 206 drives implement 110 to a corresponding implement position proportional to the position of lever 222 in its operating range, including the two detent positions.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

For example, although the system described herein has several controllers coupled together over a CAN bus, a single digital controller may be provided. The functions do not need to be distributed in the manner shown between the individual controllers. Each controller can perform other functions in addition to the functions described and illustrated herein.

As another example, a single proportional control valve is shown controlling the position of cylinder 116. In alternative embodiments, two or more valves may be interconnected to direct flow to and from cylinder 116. In yet another embodiment, two or more cylinders 116 may be connected together in parallel or in series on implement 110 to raise and lower the implement. As another alternative, the data on display screen 112 may be rearranged to appear in a different order or different orientation. Alternatively, some or all of the data on display 112 may be eliminated. As yet another alternative, pressure relief and anti-cavitation circuits may be coupled to hydraulic cylinder 116.

As another example, the implement need not have ground engaging tools attached. It may simply be an implement that the operator wishes to move between two heights. Furthermore, additional programmed positions beyond the two illustrated here may be provided by providing another SET switch with additional positions that can be set and by programming the controllers to store these additional positions when the additional SET switch has been pressed.

As a further variation, the operator input device (shown herein as lever 222) need not return automatically to a neutral position when it is released. The controllers can be alternatively configured to maintain the implement at the preferred heights for so long as the lever 222 is held or otherwise maintained in the two detent positions. As yet another variation, the detents can be eliminated entirely, such that the operator has no physical feedback in his hand that he has reached the two (now detent-less) positions. In this configuration, the operator would rely upon visual feedback that the levers were in the now detent-less positions.

As yet another alternative configuration, the forward detent position "B" can be disposed at the farthest forward limit of travel of lever 222. In this configuration, the operator would merely move the lever from the farthest forward position to the farthest backward position and vice versa in order to select the two programmed implement heights. Since the two positions would be selected merely by pushing the lever until it can go no farther, the detents could be completely eliminated.

In another alternative configuration, and operator input device can be provided that has no position limits. For example, a knob or other rolling or rotatable structure could be provided in place of lever 222. This structure could be rotated in one (or both) directions infinitely far. Knobs such as these may be found in automobiles where they are commonly used as volume controls for car stereos.

Finally, while the controls are shown embedded in or associated with an armrest of the vehicle, they need not be. They can be located on or extend from a variety of surfaces in the vehicle such as the dashboard, other control panels, or vertical posts that extend upward supporting the roof of the vehicle.

We claim:

1. A tractor implement control system for a tractor having an implement coupled thereto, the implement including at least one hydraulic actuator disposed to raise and lower at least one ground engaging tool on the implement with respect to the ground, the implement including an implement position sensor configured to generate a signal indicative of an implement height, wherein the implement height can be varied by the at least one hydraulic actuator, the control system comprising:

an operator input device configured for movement through a range of positions in a manual mode for transmitting signals indicative of a range of implement heights the input device further having assignable fixed first and second positions located within the range of travel on opposing side of a neutral position of the input device and between the neutral position and the respective extents of travel of the input device, the input device further configured to transmit a signal indicative of a first stored implement height when in the first assignable position and to transmit a signal indicative of a second stored implement height when in the second assignable position; and at least one digital controller coupled to a hydraulic valve that is responsive to the height signals and is responsive to the position sensor (1) to drive the implement to the first implement height when the input device is moved to the assignable first position and released within a predetermined period of time to return to a neutral position and (2) to drive the implement to the second implement height when the input device is moved to the assignable second position and released within a predetermined period of time to return to the neutral position;

wherein the at least one digital controller is further configured to associate and store any of a plurality of different first implement heights between and including an upper and lower range of travel of the implement to the first assignable fixed position and any of a plurality of second implement heights between end including an upper and lower range of travel of the implement to the second assignable fixed position the at least one digital controller including control logic configured to calculate (1) a height difference value between the first implement height and an actual height of the implement indicated by the position sensor when controlling the implement at the first implement height, and (2) a height difference value between the second implement height and the actual height of the implement indicated by the position sensor when controlling the implement at the second implement height; and the at least one digital controller configured to have an automatic mode to actively control the implement at at least one of the first and second implement controlled to heights such that the Implement is adjusted for movement above and below the height.

2. The system of claim 1, further comprising an auxiliary hydraulic valve mounted on the tractor, the valve being configured to regulate the flow of hydraulic fluid to the hydraulic actuator, and further wherein the at least one digital controller includes at least first and second digital controllers, the first digital controller being coupled to the operator input device, and the second digital controller being coupled to the valve.

3. The system of claim 2, further comprising a serial communications link coupling the first and second digital controllers.

4. The system of claim 1, wherein the at least one digital controller further includes control logic for controlling the implement at both the first implement height and at the second implement height, the controller configured to generate an error signal from the subtracted height difference between an implement height and an actual height of the implement; and further wherein the control logic is selected from the group consisting of a lookup table configured for associating an error signal with corresponding corrective valve signal and a PID control algorithm configured to take the error signal and determine proportional, integral, and derivative control signal components therefrom and multiply each of the components by a corresponding proportional, integral, and derivative constants, and sum each resultant value together wherein the combined signal is applied as the corrected valve control signal.

5. The system of claim 1, wherein the at least one digital controller includes control logic configured override the automatic mode such that the implement is movable upwardly or downwardly from both the first or second selected implement height, without changing the stored implement heights by moving the input device to a position away from the neutral position when the digital controller is actively controlling the height of the implement at either the first or second implement heights.

6. The system of claim 1, wherein the input device is configured to provide the operator with feedback when placed in both the input device first position and the input device second position;

a display configured to show in graphical form on a display (1) the range of travel of the implement, (2) the actual position or height of the implement, (3) a first set point indicating an tapper one of the two programmed implement heights, (4) a second set point indicating a lower one of the two programmed implement heights while controller is automatically controlling the height of the implement, the implement position is continually updated on the display; and the first and second set points are displayed proportionately to their placement in the travel of the implement from its least height to its greatest height and the first and second set points are also displayed graphically as physical marks adjacent to the bar.

7. The system of claim 1, wherein the implement includes a plurality of downwardly-extending ground engaging tools, and further wherein the at least one digital controller can set the first implement height set point at an implement height wherein the ground engaging tools are entirely above the ground, and further wherein the at least one digital controller can set the second implement height set point at an implement height wherein the ground engaging tools extend at least partially underneath the surface of the ground.

8. The system of claim 1, wherein the input device is a lever having a range of motion from a first position limit to a second position limit, and further wherein the input device first position is in the range of 5 and 15 degrees from the first position limit, and further wherein the input device second position is at the second position limit.

9. A height control system for controlling the height of an implement above the ground, wherein the implement is coupled to a tractor, the implement including at least one hydraulic actuator disposed to raise and lower the implement with respect to the ground, the implement including an implement position sensor configured to generate a signal indicative of an implement height, wherein the implement height can be varied by the at least one hydraulic actuator, the control system comprising:

means for transmitting configured for movement through a range of positions in a manual mode for transmitting signals indicative of a range of implement heights, the means for transmitting further having assignable fixed first and second positions located within the range of travel on opposing side of a neutral position of the means for transmitting and between the neutral position and the respective extent of travel of the means for transmitting, the means for transmitting configured to transmit a signal indicative of a stored first implement height when said means for transmitting is in the first assignable position and for transmitting a signal indicative of a second stored implement height when said means for transmitting is in the second assignable position; and first means for controlling a height of the implement, said first means for controlling being coupled to the implement, to the means for transmitting, and to the position sensor to responsively drive the implement to the first implement height when the means for transmitting is moved to the first position and released within a predetermined period of time to return to neutral and to responsively drive the implement to the second implement height when the means for transmitting is moved to the second position and released within a predetermined period of time to return to neutral;

wherein the means for controlling is further configured to associate any of a plurality of different first implement heights between and including an upper and lower range of travel of the implement to the first assignable fixed position and any of a plurality of second implement heights between and including an upper and lower range of travel of the implement to the second assignable fixed position, the means for transmitting including control logic configured to calculate (1) a height difference value between the first implement height and an actual height of the implement indicated by the means for transmitting when controlling the implement at the first implement height, and (2) a height difference value between the second implement height and the actual height of the implement indicated by the means for transmitting when controlling the implement at the second implement height; and the first means for controlling configured to have an automatic mode actively controlling control the implement at at least one of the first and second implement controlled to heights such that the implement is adjusted to correct for movement above and below that height.

10. The system of claim 9, further comprising second means for controlling hydraulic fluid flow that is mounted on the tractor and is coupled to the first means for controlling, wherein the second means Is configured to regulate the flow of hydraulic fluid to the hydraulic actuator.

11. The system of claim 10, wherein the first means for controlling includes at least first and second digital controllers, the first digital controller being coupled to the means for transmitting, and the second digital controller being coupled to the second means for controlling.

12. The system of claim 11, further comprising a means for providing digital communications between the first and second digital controllers.

13. The system of claim 9, wherein first means for controlling further includes control logic for controlling the implement at both the first implement height, and at the second implement height, the means for controlling configured to generate an error signal from the subtracted height difference between the first or second implement height and an actual height of the implement and further wherein the control logic includes a lookup table or a PID control algorithm the control logic configured to select a valve control signal based on the error signal.

14. The system of claim 9, wherein the first means for controlling includes control logic configured to determine from the height difference a desired corrective valve signal, and the valve signal is proportional to the desired displacement of the valve, which in turn is proportional to the desired flow rate of hydraulic fluid through the valve such that the flow rate to and the rate at which the implement is moved.

15. The system of claim 9, wherein the means for transmitting is configured to provide tactile feedback to the operator when the operator moves the means for transmitting to the first position of the means for transmitting and is also configured to provide tactile feedback to the operator when the operator moves the means for transmitting to the second position of the means for transmitting moving the implement to a second implement position with respect to the ground using the operator input device;

recording the second implement position in a memory circuit of the at least one digital controller;

moving the operator input device to a second operator input device position and releasing the input device from the second position to return to the neutral position within a predetermined period of time; and automatically controlling the implement at the second implement position based upon the step of moving to the second position and releasing from the second position.

16. The system of claim 9, wherein the implement includes a plurality of downwardly-extending ground-engaging tools, and further wherein the first means for controlling can set the first implement height set point at an implement height wherein the ground engaging tools are entirely above the ground, and further wherein the first means for controlling can set the second implement height set point at an implement height wherein the ground engaging tools extend at least partially underneath the surface of the ground.

17. The system of claim 9, wherein the means for transmitting is movable through a range of positions that extends from a first position limit to a second position limit, and further wherein the first position of the means for transmitting is between five and 15 degrees from the first position limit, and further wherein the second position of the means for transmitting is between five and 15 degrees from the second position limit.

* * * * *